(12) United States Patent
Lian et al.

(10) Patent No.: US 11,539,232 B2
(45) Date of Patent: Dec. 27, 2022

(54) DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Long Lian, Beijing (CN); Ruijun Hao, Beijing (CN); Zhongping Zhao, Beijing (CN); Xiaojie Wang, Beijing (CN); Wulijibaier Tang, Beijing (CN)

(73) Assignees: Ordos Yuansheng Optoelectronics Co., Ltd., Inner Mongolia (CN); Beijing BOE Technology Development Co., Ltd., Beijing (CN)

( * ) Notice: Subject to any disclaimer, the term of this patent is extended or adjusted under 35 U.S.C. 154(b) by 482 days.

(21) Appl. No.: 16/643,219

(22) PCT Filed: Mar. 19, 2019

(86) PCT No.: PCT/CN2019/078682
§ 371 (c)(1),
(2) Date: Feb. 28, 2020

(87) PCT Pub. No.: WO2019/184765
PCT Pub. Date: Oct. 3, 2019

(65) Prior Publication Data
US 2020/0203984 A1 Jun. 25, 2020

(30) Foreign Application Priority Data

Mar. 30, 2018 (CN) .......................... 201820445259.0

(51) Int. Cl.
*H02J 7/32* (2006.01)
*H02K 7/18* (2006.01)

(52) U.S. Cl.
CPC .............. *H02J 7/32* (2013.01); *H02K 7/1892* (2013.01); *G09G 2330/022* (2013.01)

(58) Field of Classification Search
CPC .... H02J 7/32; H02K 7/1892; G09G 2330/022
See application file for complete search history.

(56) References Cited

U.S. PATENT DOCUMENTS 4,423,334 A * 12/1983 Jacobi ..................... F03B 13/20
290/53
5,460,099 A * 10/1995 Matsuhisa ............. F16F 15/022
104/115
(Continued)

FOREIGN PATENT DOCUMENTS

CN 201181850 Y 1/2009
CN 101997333 A 3/2011
(Continued)

*Primary Examiner* — Pedro J Cuevas
(74) *Attorney, Agent, or Firm* — Nath, Goldberg & Meyer; Joshua B. Goldberg

(57) ABSTRACT

A display device, including a backplane, and a power generation component disposed on the backplane for converting kinetic energy generated by movement of the display device into electric energy and supplying power to the display device using the generated electric energy, the power generation component includes a generator, and a swing component with an eccentric structure, the swing component being connected to the generator and swingable during movement of the display device, so as to drive the generator to operate.

10 Claims, 2 Drawing Sheets

(56) References Cited

U.S. PATENT DOCUMENTS

| | | | | |
|---|---|---|---|---|
| 6,316,906 | B1* | 11/2001 | Lozada | H01M 10/46 320/101 |
| 7,239,038 | B1* | 7/2007 | Zimmerman | F03B 13/20 290/43 |
| 7,375,436 | B1* | 5/2008 | Goldin | F03G 7/08 74/61 |
| 7,847,421 | B2* | 12/2010 | Gardner | F03G 7/08 290/1 R |
| 8,030,786 | B2* | 10/2011 | Jackson | F03G 7/08 290/1 R |
| 8,344,693 | B2* | 1/2013 | Budziszek | H02J 7/32 320/112 |
| 8,350,394 | B2* | 1/2013 | Cottone | H02N 2/186 290/1 R |
| 8,476,778 | B2* | 7/2013 | Weinberger | F03G 5/00 290/42 |
| 9,525,323 | B1* | 12/2016 | Lee | F03G 3/06 |
| 9,590,474 | B2* | 3/2017 | Rastegar | H02K 7/1853 |
| 9,979,225 | B2* | 5/2018 | Bernhard | H02J 7/32 |
| 10,144,254 | B2* | 12/2018 | Richardson | F04B 49/22 |
| 10,245,908 | B2* | 4/2019 | Richardson | F04B 35/01 |
| 10,345,758 | B2* | 7/2019 | Zhang | G04C 10/02 |
| 10,355,558 | B2* | 7/2019 | Bao | H01L 35/30 |
| 10,579,017 | B2* | 3/2020 | Zhou | F03G 7/08 |
| 10,814,683 | B2* | 10/2020 | Richardson | F04B 39/121 |
| 10,814,684 | B2* | 10/2020 | Richardson | F04B 9/042 |
| 2007/0210580 | A1* | 9/2007 | Roberts | H02P 9/006 290/1 R |
| 2008/0174120 | A1* | 7/2008 | Gardner | H02K 7/1892 322/3 |
| 2009/0104947 | A1* | 4/2009 | Godston | H02J 7/32 455/573 |
| 2009/0200093 | A1* | 8/2009 | Ren | B62D 61/00 180/215 |
| 2009/0200983 | A1* | 8/2009 | Dyer | H02K 7/1876 320/107 |
| 2010/0011890 | A1* | 1/2010 | Tseng | H02K 7/1853 74/143 |
| 2010/0032946 | A1* | 2/2010 | Begley | H02K 35/02 290/1 R |
| 2010/0045119 | A1* | 2/2010 | Jackson | H02K 7/1876 310/20 |
| 2012/0181989 | A1* | 7/2012 | Li | F03G 7/08 320/137 |
| 2013/0023365 | A1* | 1/2013 | Idoni-Matthews | A63B 43/06 473/570 |
| 2014/0152241 | A1* | 6/2014 | Panos | H02J 7/32 290/1 A |
| 2016/0134172 | A1* | 5/2016 | Xiao | H02K 35/02 290/1 C |
| 2017/0101983 | A1* | 4/2017 | Jones | F04D 13/02 |
| 2018/0102691 | A1* | 4/2018 | Wu | H02K 7/1807 |
| 2018/0119679 | A1* | 5/2018 | Wu | H02K 7/1807 |
| 2019/0041798 | A1* | 2/2019 | Zhang | G04B 5/08 |
| 2019/0140517 | A1* | 5/2019 | Bao | H02K 7/108 |
| 2019/0339649 | A1* | 11/2019 | Zhou | G04B 5/02 |

FOREIGN PATENT DOCUMENTS

| | | |
|---|---|---|
| CN | 203840385 U | 9/2014 |
| CN | 105047691 A | 11/2015 |
| CN | 207926367 U | 9/2018 |
| JP | 2002281684 A | 9/2002 |

* cited by examiner

DISPLAY DEVICE

CROSS-REFERENCE TO RELATED APPLICATION

This is a National Phase Application filed under 35 U.S.C. 371 as a national stage of PCT/CN2019/078682, filed on Mar. 19, 2019, an application claiming priority to Chinese patent application No. 201820445259.0 filed on Mar. 30, 2018, the entire contents of each of which are incorporated herein by reference.

TECHNICAL FIELD

The present disclosure relates to the field of display technologies, and particularly relates to a display device.

BACKGROUND

Existing display devices such as mobile phones, tablets and laptops are becoming larger and larger in size, higher and higher in brightness, and wider and wider in color gamut, which lead to higher and higher power consumption of the display devices. As a result, the display devices have a shorter battery life and thus the use time of the display devices is influenced.

Therefore, there is an urgent need for a display device to solve the above technical problem.

SUMMARY

In view of the deficiencies described above in the background part, the present disclosure proposes a display device for at least partially solving the problem of short battery life of known display devices.

The present disclosure provides a display device, including a backplane, and at least one power generation component disposed on the backplane for converting kinetic energy generated by movement of the display device into electric energy and supplying power to the display device using the electric energy, each of the at least one power generation component including a generator and a swing component with an eccentric structure, the swing component being connected to the generator and swingable during movement of the display device, so as to drive the generator to operate.

Optionally, the swing component includes an eccentric pendulum or an eccentric balance.

Optionally, each power generation component further includes a transmission component located between and respectively connected to the swing component and the generator for transmitting motion of the connected swing component to the generator.

Optionally, the transmission component includes a ratchet and a gear engaged with each other, the connected swing component is connected to a first central hole in the ratchet, and the generator is connected to a second central hole in the gear.

Optionally, a transmission ratio of the gear to the ratchet is 3-6.

Optionally, the transmission component further includes a stop pawl disposed at a periphery of the ratchet with one end located between two adjacent teeth of the ratchet so that the ratchet is rotated clockwise or counterclockwise.

Optionally, six power generation components are provided.

Optionally, the display device further includes a shared first battery connected to each power generation component for storing the electric energy converted by the power generation component.

Optionally, the display device further includes a second battery for supplying power to the display device, the first battery being connected to the second battery and further configured to charge the second battery.

Optionally, the display device further includes a shared controller connected to the first battery for controlling the first battery to charge the second battery when the display device is in a standby or power-off state.

DETAILED DESCRIPTION OF THE EMBODIMENTS

To improve understanding of the technical solution of the present disclosure for those skilled in the art, the display device provided in the disclosure will be described below in detail in conjunction with the accompanying drawings.

Figure 1:
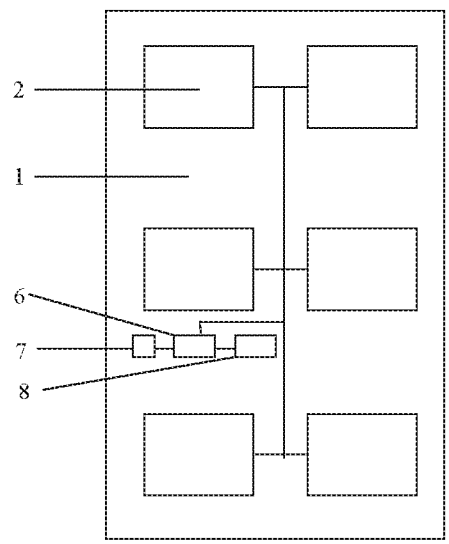
FIG. 1 is a schematic structural diagram of a display device according to an embodiment.

In an exemplary embodiment, there is provided a display device which, as shown in FIG. 1, includes a backplane 1 and a power generation component 2 disposed on the backplane 1. While the display device is moved, the power generation component 2 may convert kinetic energy generated by movement of the display device into electric energy and supply power to the display device using the converted electric energy.

In this embodiment, the power generation component 2 is disposed on the backplane 1, and accordingly, while the display device is moved, the power generation component 2 may convert kinetic energy generated by movement of the display device into electric energy and supply power to the display device using the converted electric energy, thereby increasing the battery life, and thus the use time, of the display device. In addition, the display device provided by the embodiment utilizes the kinetic energy generated during movement of the display device, thereby reducing waste of energy as well as use cost of the display device.

Optionally, the power generation component 2 and the backplane 1 are removably connected. In this way, replacement and maintenance of the power generation component 2 are facilitated.

Further optionally, a plurality of power generation components 2 are provided. In this way, each power generation component 2 may generate more electric energy, and the battery life of the display device may be better improved accordingly.

The specific structure of the power generation component 2 will be described in detail below with reference to FIGS. 2 and 3.

Figure 2:
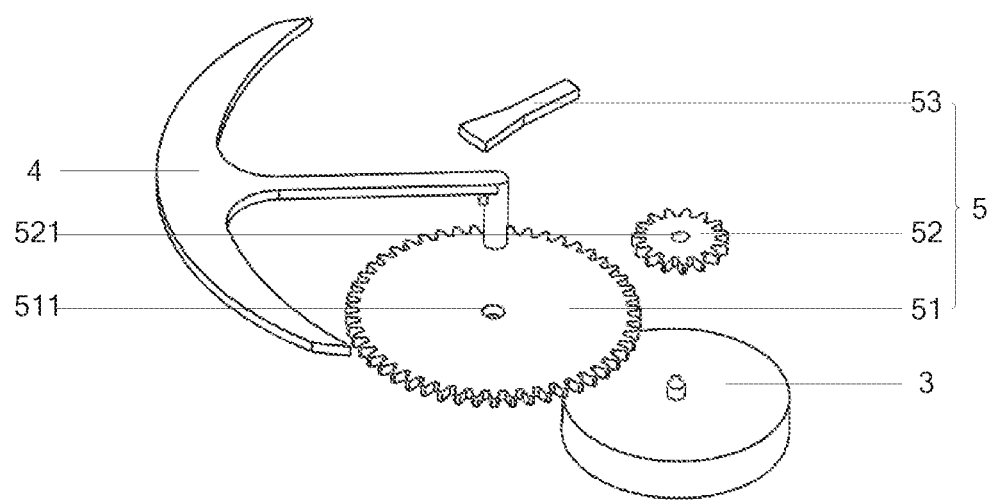
FIG. 2 is a structural exploded view of the power generation component in FIG. 1.
Figure 3:
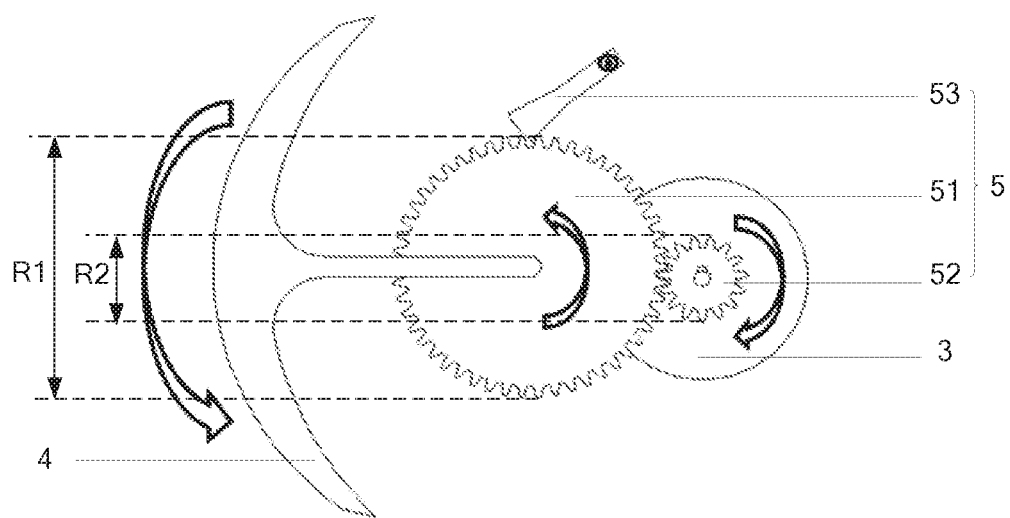
FIG. 3 is a top view of the power generation component in FIG. 1.

As shown in FIGS. 2 and 3, the power generation component 2 may include a generator 3, and a swing component 4 connected to the generator 3. While the display device is moved, the swing component 4 may be swung to drive the generator 3 to operate.

Specifically, the swing component 4 may be connected to a rotor of the generator 3, and when the display device is moved, the swing component 4 may, under an action of its own gravity, drive the rotor of the generator 3 to rotate so that accordingly, the generator 3 may generate electric energy.

Optionally, the rotor is provided with a conductive coil which, when the rotor is rotated, may cut a magnetic induction line so that the corresponding flux is changed to make the conductive coil generate induced electromotive force (i.e., electric energy).

Optionally, the swing component 4 may include an eccentric pendulum or an eccentric balance.

As shown in FIGS. 2 and 3, the power generation component 2 may further include a transmission component 5 located between and respectively connected to the swing component 4 and the generator 3 for transmitting motion of the swing component 4 to the generator 3.

Specifically, the transmission component 5 may include a ratchet 51 and a gear 52 engaged with each other. The swing component 4 is connected to a first central hole 511 in the ratchet 51, and the generator 3 is connected to a second central hole 521 in the gear 52.

When the swing component 4 is swung, the swing component 4 may drive the ratchet wheel 51 to rotate, and then the ratchet wheel 51 drives the gear 52 to rotate and the gear 52 drives the generator 3 to operate. That is, the second central hole 521 of the gear 52 is connected to the rotor of the generator 3, and the gear 52 may drive the rotor of the generator 3 to rotate so that accordingly, the generator 3 may generate electric energy.

Optionally, a shaft of the swing component 4 and the first central hole 511 in the ratchet 51 may be connected by a key or a spline so that the coupling strength of the swing component 4 and the ratchet 51 is increased, and durability of the coupling position between the swing component 4 and the ratchet 51 is improved. A shaft of the generator 3 and the second central hole 521 in the gear 52 may also be connected by a key or a spline so that the coupling strength of the generator 3 and the gear 52 is increased, and durability of the coupling position between the generator 3 and the gear 52 is improved.

To improve the efficiency of the power generation component 2 in converting kinetic energy into electric energy, a diameter R1 of the ratchet 51 is greater than a diameter R2 of the gear 52, i.e. when the ratchet 51 and the gear 52 are rotated at the same linear velocity, the ratchet 51 has an angular velocity less than the gear 52. When the swing component 4 is swung, since the ratchet 51 has an angular velocity less than the gear 52, an angle of the swing component 4 driving the ratchet 51 to rotate is accordingly smaller than an angle of the ratchet 51 driving the gear 52 to rotate so that the rotor of the generator 3 is rotated by a larger angle, and the generator 3 accordingly generates more electric energy.

Optionally, a transmission ratio of the gear 52 to the ratchet 51 is 3-6. That is, when the swing component 4 is swung, the angular velocity of the gear 52 is 3 to 6 times of that of the ratchet 51. In this way, not only the efficiency of the power generation component 2 in converting kinetic energy into electric energy is improved, but also phenomena such as engagement failure or sliding teeth between the ratchet 51 and the gear 52 caused by a large difference between the diameter R1 of the ratchet 51 and the diameter R2 of the gear 52 are avoided.

As shown in FIGS. 2 and 3, the transmission component 5 may further include a stop pawl 53 disposed on a periphery of the ratchet 51 with one end located between two adjacent teeth of the ratchet 51 so that the ratchet 51 is rotated clockwise or counterclockwise.

Specifically, in an embodiment of the present disclosure, the one end of the stop pawl 53 is located in a tooth groove of the ratchet 51. When the swing component 4 drives the ratchet 51 to rotate counterclockwise, the stop pawl 53 may slide on a tooth back of the ratchet 51; and when the swing component 4 drives the ratchet 51 to rotate clockwise, the stop pawl 53 may, under an action of its own structure, prevent the ratchet 51 from rotating clockwise and keep the ratchet 51 still so that when the swing component 4 is swung, the ratchet 51 can only rotate counterclockwise, while accordingly, the gear 52 can only drive the rotor of the generator 3 to rotate clockwise. Since the rotor of the generator 3 is rotatable only in one direction (i.e., clockwise), accordingly, the electric energy generated by the generator 3 is DC electric energy, thereby improving stability of the electric energy generated by the power generation component 2.

It should be noted that it is also possible that the stop pawl 53 limits the ratchet 51 to rotate only in the clockwise direction, and accordingly, the rotor of the corresponding generator 3 is rotatable only in the counterclockwise direction.

It should be also noted that the backplane 1 may be made of a transparent material so that a user can observe swing of the swing component 4 and rotation of the transmission component 5, which can improve an ornamental value and use enjoyment of the display device.

Further, the display device may further include a first battery 6 connected to the power generation component 2 for storing the electric energy converted by the power generation component 2.

Specifically, when electric energy is generated by the generator 3, the first battery 6 may store the electric energy generated by the generator 3 for later power supply to the display device.

Optionally, the first battery 6 may be a lead-acid battery.

Since relatively less kinetic energy is generated during movement of the display device, the first battery 6 accordingly stores relatively less electric energy, which makes the first battery 6 fail to drive the display device to operate. Further, the display device may further include a second battery 8 for supplying power to the display device. The first battery 6 is connected to the second battery 8 and further configured to charge the second battery 8.

Specifically, the electric energy in the first battery 6 may be stored in the second battery 8, and accordingly, the first battery 6 may increase the battery life of the second battery 8, thereby increasing the use time of the display device.

Optionally, the second battery 8 may be a lithium battery.

Further, the display device may further include a controller 7 connected to the first battery 6 for controlling the first battery 6 to charge the second battery 8 when the display device is in a standby or power-off state. The charging process of the first battery 6 for the second battery 8 may easily cause abnormal parameters in power supply to the display device by the second battery 8. However, by controlling the first battery 6 to charge the second battery 8 when the display device is in a standby or power-off state, the defect of abnormal display in the display device can be avoided.

Optionally, the controller 7 may be a MCU or CPU.

It will be appreciated that the above embodiments are merely exemplary embodiments for the purpose of illustrating the principle of the present disclosure, and the present disclosure is not limited thereto. Various modifications and improvements can be made by a person having ordinary skill in the art without departing from the essence of the disclosure. Accordingly, all of these modifications and improvements also fall into the protection scope of the disclosure.

What is claimed is:

1. A display device, comprising a backplane, and at least one power generation component disposed on the backplane for converting kinetic energy generated by movement of the display device into electric energy and supplying power to the display device using the electric energy, each of the at least one power generation component comprising a generator and a swing component with an eccentric structure, the swing component being connected to the generator and swingable during movement of the display device, so as to drive the generator to operate.

2. The display device according to claim 1, wherein the swing component comprises an eccentric pendulum or an eccentric balance.

3. The display device according to claim 2, wherein each power generation component further comprises a transmission component located between and respectively connected to the swing component and the generator for transmitting motion of the connected swing component to the generator.

4. The display device according to claim 3, wherein the transmission component comprises a ratchet and a gear engaged with each other, the connected swing component is connected to a first central hole in the ratchet, and the generator is connected to a second central hole in the gear.

5. The display device according to claim 4, wherein a transmission ratio of the gear to the ratchet is 3-6.

6. The display device according to claim 5, wherein the transmission component further comprises a stop pawl disposed at a periphery of the ratchet with one end located between two adjacent teeth of the ratchet so that the ratchet is rotated clockwise or counterclockwise.

7. The display device according to claim 6, wherein six power generation components are provided.

8. The display device according to claim 7, further comprising a shared first battery connected to each power generation component for storing the electric energy converted by the power generation component.

9. The display device according to claim 8, further comprising a second battery for supplying power to the display device, the first battery being connected to the second battery and further configured to charge the second battery.

10. The display device according to claim 9, further comprising a shared controller connected to the first battery for controlling the first battery to charge the second battery when the display device is in a standby or power-off state.

* * * * *